US012677278B2

(12) United States Patent
Ye et al.

(10) Patent No.: US 12,677,278 B2
(45) Date of Patent: Jul. 7, 2026

(54) TYPE-2 HARQ-ACK CODEBOOK FOR MULTI-CELL SCHEDULING DCI

(71) Applicant: Apple Inc., Cupertino, CA (US)

(72) Inventors: Sigen Ye, San Diego, CA (US); Chunxuan Ye, San Diego, CA (US); Dawei Zhang, Saratoga, CA (US); Haitong Sun, Cupertino, CA (US); Hong He, San Jose, CA (US); Huaning Niu, San Jose, CA (US); Oghenekome Oteri, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 18/299,867

(22) Filed: Apr. 13, 2023

(65) Prior Publication Data

US 2023/0345482 A1    Oct. 26, 2023

Related U.S. Application Data

(60) Provisional application No. 63/363,722, filed on Apr. 28, 2022, provisional application No. 63/363,397, filed on Apr. 22, 2022.

(51) Int. Cl.
*H04W 72/1273* (2023.01)
*H04L 1/1812* (2023.01)
*H04W 72/23* (2023.01)

(52) U.S. Cl.
CPC ....... *H04W 72/1273* (2013.01); *H04L 1/1812* (2013.01); *H04W 72/23* (2023.01)

(58) Field of Classification Search
CPC   H04W 72/1273; H04W 72/23; H04L 1/1812; H04L 1/1861
See application file for complete search history.

(56) References Cited

U.S. PATENT DOCUMENTS

| | | | | |
|---|---|---|---|---|
| 11,824,666 B2 * | 11/2023 | Kim | ..................... | H04L 1/1887 |
| 2021/0250134 A1 * | 8/2021 | Islam | ................... | H04B 7/0626 |
| 2022/0167296 A1 * | 5/2022 | Park | ...................... | H04W 24/10 |
| 2022/0279454 A1 * | 9/2022 | Papasakellariou | .... | H04W 72/23 |
| 2023/0139269 A1 * | 5/2023 | MolavianJazi | ....... | H04L 5/0094 370/329 |
| 2023/0171040 A1 * | 6/2023 | Gao | ..................... | H04L 5/0044 370/329 |

(Continued)

OTHER PUBLICATIONS

NEC, "Multi-cell PDSCH scheduling via a single DCI", 3GPP TSG RAN WG1#105-e, R1-2105412, May 11, 2021, 4 sheets.

(Continued)

*Primary Examiner* — Rasheed Gidado
(74) *Attorney, Agent, or Firm* — Fay Kaplun & Marcin, LLP

(57) ABSTRACT

A user equipment (UE) is configured to receive at least a first downlink control information (DCI) from a base station of a network, the first DCI scheduling multiple physical downlink shared channels (PDSCH) across multiple cells of the UE, construct a Type 2 hybrid automatic repeat request (HARQ) acknowledgement (HARQ-ACK) codebook based at least on a number of DCI scheduling PDSCH corresponding to the Type 2 HARQ-ACK codebook and transmit the Type 2 HARQ-ACK codebook feedback in a physical uplink channel.

17 Claims, 7 Drawing Sheets

Method
700

(56) References Cited

U.S. PATENT DOCUMENTS

| | | | |
|---|---|---|---|
| 2023/0371020 A1* | 11/2023 | Wu | H04W 72/20 |
| 2024/0057108 A1* | 2/2024 | Yi | H04L 1/1854 |
| 2025/0158755 A1* | 5/2025 | Shibaike | H04W 72/04 |

OTHER PUBLICATIONS

Moderator (LG Electronics), "Summary #1 of PDSCH/PUSCH enhancements (Scheduling/HARQ)", 3GPP TSG RAN WG1 #104b-e, R1-2103344, Apr. 15, 2021, 38 sheets.

* cited by examiner

UE 110

Processor 205

Codebook Construction Engine 235

Memory Arrangement 210

Transceiver 225

Other Components 230

Display Device 215

I/O Device 220

Base Station 300

Diagram
500

Diagram
550

Diagram
600

Diagram
650

Method
700

TYPE-2 HARQ-ACK CODEBOOK FOR MULTI-CELL SCHEDULING DCI

PRIORITY/INCORPORATION BY REFERENCE

This application claims priority to U.S. Provisional Application Ser. No. 63/363,397 filed on Apr. 22, 2022, and entitled "Type-2 HARQ-ACK Codebook for Multi-Cell Scheduling DCI" and U.S. Provisional Application Ser. No. 63/363,722 filed on Apr. 28, 2022, and entitled "Type-2 HARQ-ACK Codebook for Multi-Cell Scheduling DCI," both of which are incorporated by reference herein.

BACKGROUND

A hybrid automatic repeat request (HARQ) process generally refers to a signaling exchange between a device transmitting data (e.g., a gNB transmitting a physical downlink shared channel (PDSCH) and a device receiving the data (e.g., a user equipment (UE) receiving the PDSCH), where the receiving device sends feedback to the transmitting device concerning the transmitted data. The feedback can comprise an acknowledgement (ACK) when the transmission is successful and a negative acknowledgement (NACK) when the transmission is unsuccessful. The HARQ-ACK codebook generally refers to a mechanism or algorithm that is used for multiplexing HARQ-ACK feedback. For 5G NR, the Type 2 HARQ-ACK codebook has a dynamic size and is configured dynamically according to the resource allocation in downlink control information (DCI).

In some scenarios, a single DCI can schedule multiple PDSCH transmissions across multiple cells. However, the existing Type 2 HARQ-ACK codebook mechanism assumes a single DCI can schedule PDSCH transmissions for only a single cell. Thus, the Type 2 HARQ-ACK codebook mechanism as currently specified cannot be applied for multi-cell scheduling using a single DCI.

SUMMARY

Some exemplary embodiments are related to a processor of a user equipment (UE) configured to perform operations. The operations include receiving at least a first downlink control information (DCI) from a base station of a network, the first DCI scheduling multiple physical downlink shared channels (PDSCH) across multiple cells of the UE, constructing a Type 2 hybrid automatic repeat request (HARQ) acknowledgement (HARQ-ACK) codebook based at least on a number of DCI scheduling PDSCH corresponding to the Type 2 HARQ-ACK codebook and transmitting the Type 2 HARQ-ACK codebook feedback in a physical uplink channel.

Other exemplary embodiments are related to a user equipment (UE) having a transceiver configured to communicate with a base station of a network and a processor communicatively coupled to the transceiver and configured to perform operations. The operations include receiving at least a first downlink control information (DCI) from the base station of the network, the first DCI scheduling multiple physical downlink shared channels (PDSCH) across multiple cells of the UE, constructing a Type 2 hybrid automatic repeat request (HARQ) acknowledgement (HARQ-ACK) codebook based at least on a number of DCI scheduling PDSCH corresponding to the Type 2 HARQ-ACK codebook and transmitting the Type 2 HARQ-ACK codebook feedback in a physical uplink channel.

Further exemplary embodiments are related to a processor of a base station configured to perform operations. The operations include transmitting at least a first downlink control information (DCI) to a user equipment (UE), the first DCI scheduling multiple physical downlink shared channels (PDSCH) across multiple cells of the UE, receiving a Type 2 hybrid automatic repeat request (HARQ) acknowledgement (HARQ-ACK) codebook based at least in part on a number of DCI received scheduling PDSCH corresponding to the HARQ-ACK codebook, wherein the Type 2 HARQ-ACK codebook is further based on whether HARQ-ACK bundling across cells is enabled for the UE and processing the physical uplink channel according to the Type 2 HARQ-ACK codebook construction to determine HARQ-ACK feedback for the PDSCH.

DETAILED DESCRIPTION

Figure 1:
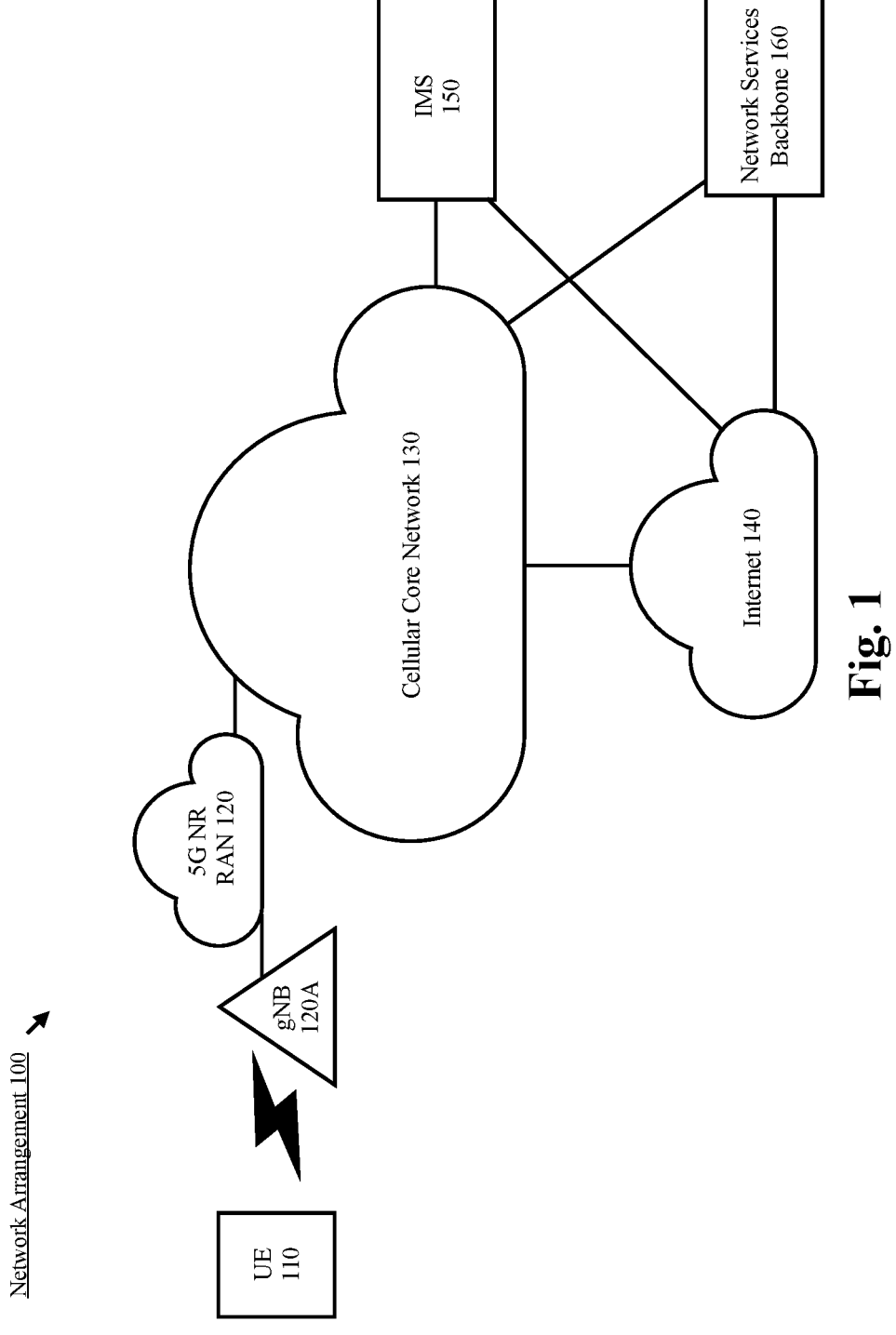
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe operations for constructing a Type 2 HARQ-ACK codebook for providing hybrid automatic repeat request (HARQ) acknowledgement (ACK) feedback when a single downlink control information (DCI) schedules multiple physical downlink shared channels (PDSCH) across multiple cells.

The exemplary embodiments are described with regard to a user equipment (UE). Those skilled in the art will understand that the UE may be any type of electronic component that is configured to communicate via a network, e.g., mobile phones, tablet computers, desktop computers, smartphones, phablets, embedded devices, wearables, Internet of Things (IoT) devices, etc. Therefore, the UE as described herein is used to represent any electronic component that directly communicates with the network.

The exemplary embodiments are also described with regard to a 5G New Radio (NR) network. However, reference to a 5G NR network is merely provided for illustrative purposes. The exemplary embodiments may be utilized with any network implementing HARQ-ACK codebook construction methodologies similar to those described herein. Therefore, the 5G NR network as described herein may represent any type of network implementing similar HARQ-ACK codebook functionalities as the 5G NR network.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables (e.g., HMD, AR glasses, etc.), Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The 5G NR RAN 120 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

The UE 110 may connect to the 5G NR-RAN 120 via the gNB 120A. Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., gNB 120A). However, as mentioned above, reference to the 5G NR-RAN 120 is merely for illustrative purposes and any appropriate type of RAN may be used.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
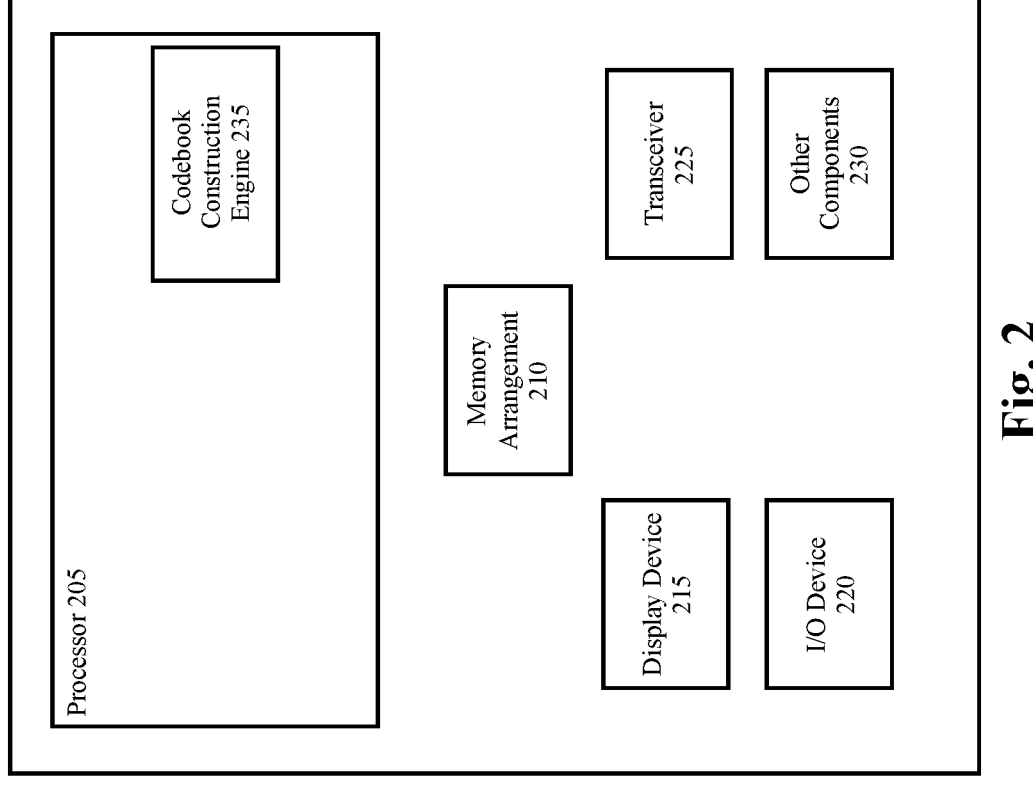
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a codebook construction engine 235 for performing various operations related to constructing a Type 2 HARQ-ACK codebook for multiple PDSCHs scheduled across multiple cells by a single DCI. These operations may include receiving a network configuration enabling HARQ-ACK bundling across multiple cells. The operations may further include receiving one or more single DCI scheduling multiple PDSCHs across multiple cells (and/or one or more DCI scheduling a single PDSCH on a single cell), determining a size of the HARQ-ACK codebook, and constructing the codebook based on factors including: whether HARQ-ACK bundling is enabled; how many cell groups are configured for bundling; and a maximum number of transport blocks (e.g., 1 or 2). The operations may further include transmitting the Type 2 HARQ-ACK codebook on the PUCCH or PUSCH.

The above referenced codebook construction engine 235 being an application (e.g., a program) executed by the processor 205 is provided merely for illustrative purposes. The functionality associated with the codebook construction engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120 and/or any other appropriate type of network. Accordingly, the transceiver 225 may operate on a variety of different frequencies or channels (e.g., set of consecutive frequencies).

Figure 3:
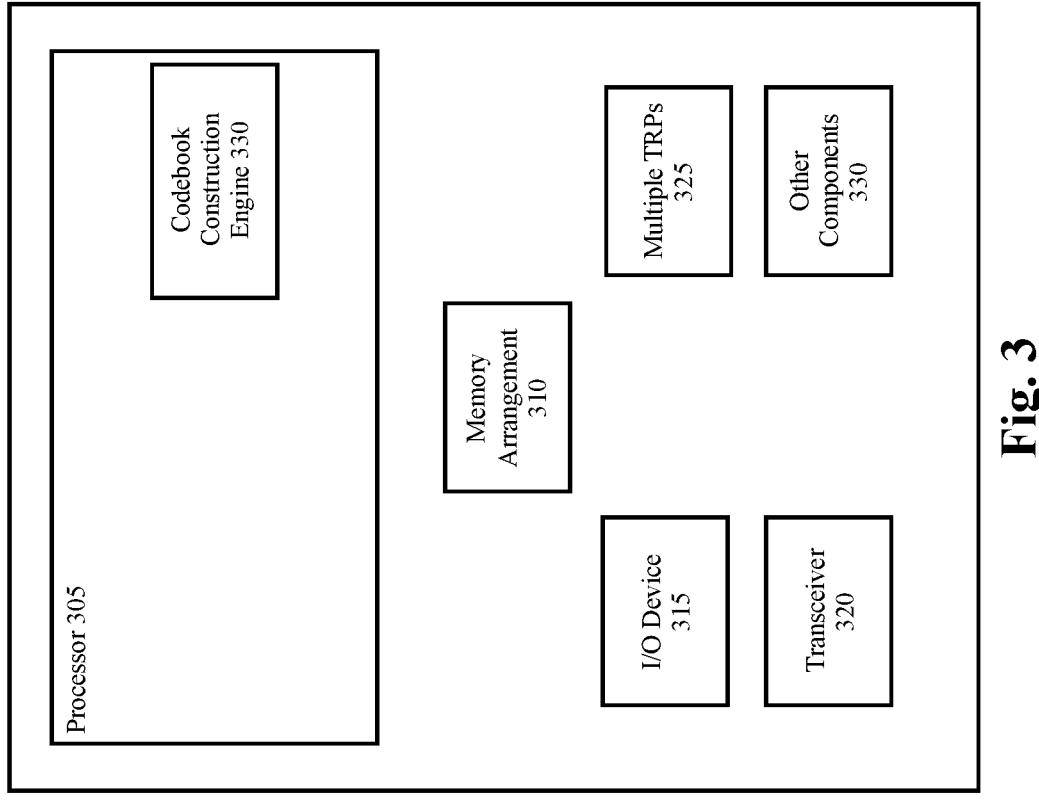
FIG. 3 shows an exemplary base station according to various exemplary embodiments.

FIG. 3 shows an exemplary base station 300 according to various exemplary embodiments. The base station 300 may represent any access node (e.g., gNB 120A, etc.) through which the UE 110 may establish a connection and manage network operations.

The base station 300 may include a processor 305, a memory arrangement 310, an input/output (I/O) device 315, a transceiver 320, and other components 325. The other components 325 may include, for example, a battery, a data acquisition device, ports to electrically connect the base station 300 to other electronic devices, etc.

The processor 305 may be configured to execute a plurality of engines of the base station 300. For example, the engines may include a codebook construction engine 330 for performing various operations related to configuring the UE to construct a Type 2 HARQ-ACK codebook for multiple PDSCHs scheduled across multiple cells by a single DCI. These operations may include transmitting a network configuration enabling HARQ-ACK bundling across multiple cells. The operations may further include transmitting one or more single DCI scheduling multiple PDSCHs across multiple cells (and/or one or more DCI scheduling a single PDSCH on a single cell) and including a DAI value in these DCI that increments according to the construction of the HARQ-ACK codebook, wherein the codebook is constructed based on factors including: whether HARQ-ACK bundling is enabled; how many cell groups are configured for bundling; and a maximum number of transport blocks (e.g., 1 or 2). The operations may further include receiving the Type 2 HARQ-ACK codebook on the PUCCH or PUSCH and processing the HARQ-ACK feedback contained therein.

The above noted codebook construction engine 330 being an application (e.g., a program) executed by the processor 305 is only exemplary. The functionality associated with the codebook construction engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory arrangement 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

A hybrid automatic repeat request (HARQ) process generally refers to a signaling exchange between a transmitting device and a receiving device. The transmitting device can transmit data to the receiving device, wherein the data is associated with a particular HARQ process ID. In response, the receiving device sends feedback to the transmitting device concerning the transmitted data, e.g., an acknowledgement (ACK) or negative acknowledgement (NACK). The feedback can indicate to the transmitting device whether the transmission of the data is successful using ACK/NACK. If the previous transmission is not successful, the transmitting device may retransmit the data.

The HARQ-ACK codebook generally refers to a mechanism or algorithm that is used for multiplexing HARQ-ACK feedback. For 5G NR, the Type 1 HARQ-ACK codebook has a fixed size and is configured by radio resource control (RRC) signaling (semi-statically). The Type 2 HARQ-ACK codebook has a dynamic size and is configured dynamically according to the resource allocation in downlink control information (DCI). The Type 3 HARQ codebook was introduced in release 16 (Rel-16) for NR unlicensed (NR-U) operations.

The size of the Type 1 HARQ-ACK codebook is based on the number of physical downlink shared channel (PDSCH) transmission occasions within a given time window without regard to the number of PDSCH transmissions actually received. In the Type 2 HARQ-ACK codebook, the downlink assignment indicator (DAI) field was introduced to identify missed transmissions. The DAI comprises 2 bits and can indicate a counter value $\{1, 2, 3, 4, 1, 2 \ldots\}$ that increments per DCI transmitted within the time window and resets to 1. For scenarios where multiple DCI are received in a single slot, a counter DAI (C-DAI) can be incremented per DCI and a total DAI (T-DAI) can indicate when multiple DCI are received in a single slot. In some scenarios, multiple sub-codebooks can be generated.

In one example, for operations>52.6 GHz frequency, for a Type 2 HARQ-ACK codebook corresponding to a DCI scheduling multiple PDSCH on a same cell, the C-DAI/T-DAI is counted per DCI. At least two sub-codebooks can be generated for a PUCCH cell group. The first sub-codebook includes HARQ-ACK bits for various cases including, e.g., DCI that are not configured with CBG-based scheduling and includes a TDRA table containing rows with a single SLIV scheduling a single PDSCH. The second sub-codebook includes HARQ-ACK bits for cases including, e.g., DCI including a TDRA table containing at least one row with multiple SLIVs scheduling multiple PDSCHs and if the number of HARQ bundling groups is larger than 1. The number of HARQ bundling groups can be configured via RRC signaling with value range $\{1, 2, 4\}$ per serving cell.

For release 18 (Rel-18), one of the objectives is to specify multi-cell PUSCH/PDSCH scheduling (e.g., one PDSCH/PUSCH per cell) with a single downlink control information (DCI), including, e.g., identifying the maximum number of cells that can be scheduled simultaneously (e.g., three or more) and consider both intra-band and inter-band CA operation and both FR1 and FR2 operation. One issue to address for multi-cell PDSCH scheduling is the Type 2 HARQ-ACK codebook. As described above, the legacy operations assume one DCI schedules one PDSCH per serving cell and are not applicable to multi-cell PDSCH scheduling operations.

According to various exemplary embodiments described herein, solutions are provided for Type-2 HARQ-ACK codebook construction with multi-cell scheduling. In one aspect, HARQ-ACK bundling across multiple cells is enabled. In another aspect, options are provided for constructing a codebook, or two or more sub-codebooks, for HARQ-ACK feedback for multi-cell scheduling.

In some embodiments all the PDSCHs scheduled by a multi-cell scheduling DCI have HARQ-ACK feedback in the same codebook/PUCCH. This means that the cells scheduled by a multi-cell scheduling DCI are within the same PUCCH group and that the HARQ-ACK for all the PDSCHs scheduled by the DCI share the same PUCCH resource in the same slot. One multi-cell scheduling DCI can schedule PDSCH(s) on 1 to N cells, where N is semi-statically configured. (e.g., N=3 or 4). There can be a mix of single-cell scheduling DCIs and multi-cell scheduling DCIs, for the same or different cells. No CBG-based transmission is considered. It is noted that "spatial bundling" as used herein refers to the bundling of the HARQ-ACK bits of two TBs in a PDSCH (legacy behavior), relative to bundling across cells, as described below.

In a first aspect of these exemplary embodiments, HARQ-ACK bundling is enabled across multiple cells. For example, HARQ-ACK bundling can be enabled across cells adjacent in frequency (e.g., intra-band carrier aggregation (CA)). Similar channel condition and interference conditions are experienced on these cells, such that there is a relatively high probability that the transmissions on these frequencies will succeed or fail at the same time.

HARQ-ACK bundling across multiple cells can be enabled via RRC signaling. In a first option, the RRC parameter(s) can explicitly indicate which cells have HARQ-ACK bundled together in a same cell group, e.g., by providing a list of cell IDs. Multiple groups of cell IDs can be provided, and HARQ-ACK bundling can be performed within each group. In a second option, an RRC parameter can indicate the number of cells per group (or the number of cell groups) to have HARQ-ACK bundled. For example, for a UE configured with one DCI scheduling 4 serving cells (CC0, CC1, CC2, CC3), an RRC parameter can indicate that there are two cell groups for HARQ-ACK bundling. This implicitly translates into HARQ-ACK bundling for CC0 and CC1, and HARQ-ACK bundling for CC2 and CC3.

In these embodiments, the HARQ-ACK feedback bit (ACK/NACK) for the HARQ-ACK-bundled cells is determined as the result of the binary 'AND' operation of the respective HARQ-ACK bits of all the serving cells within the same group. If, within the group, some cells (subgroup 1) are configured with a maximum of 2 transport blocks (TBs) without HARQ-ACK spatial bundling enabled, some cells (subgroup 2) are configured with a single TB or a max of 2 TBs with HARQ-ACK spatial bundling enabled, then the HARQ-ACK bits of the TBs in cell subgroup 2 can be bundled together with the HARQ-ACK bits of the first TBs in cell subgroup 1, and the HARQ-ACK bits of the second TBs in cell subgroup 1 can be bundled together.

Within this framework, various options can be used to construct the Type 2 HARQ-ACK codebook. In one option, a fixed number of HARQ-ACK bits are specified per DCI as an extension of the corresponding Rel-15 legacy mechanism. In another option, two sub-codebooks are specified, wherein a first sub-codebook is constructed for DCIs scheduling a single cell/PDSCH and a second sub-codebook is constructed for DCIs scheduling more than one cell/PDSCH. In still another option, more than two sub-codebooks can be supported, wherein a first sub-codebook is constructed for DCIs scheduling one cell, a second sub-codebook is constructed for DCIs scheduling two cells, etc., for, e.g., up to four cells, for further overhead reduction.

According to a first option, the Type-2 HARQ-ACK codebook construction specified in Rel-15 can be extended for multi-cell scheduling using a single DCI. As compared to the other options, the first option is relatively simple but has a larger overhead associated therewith.

In the first option, the C-DAI and T-DAI values increment per DCI, regardless of the number of CCs scheduled by the one or more respective DCI. For each incremented DAI value, N or N*2 HARQ-ACK bits are added to the codebook, depending on the maximum number of TBs configured and whether spatial bundling is enabled, where N is semi-statically configured by the network. If HARQ-ACK bundling across multiple cells is enabled, N is replaced by M, where M is the number of cell groups for HARQ-ACK bundling across cells. For example, as described above, if HARQ-ACK bundling across cells is not enabled, N HARQ-ACK bits can be added to the codebook when a single TB is configured or two TBs are configured with spatial bundling enabled, and N*2 HARQ-ACK bits are added to the codebook when two TBs are configured without spatial bundling enabled. If HARQ-ACK bundling across cells is enabled, M HARQ-ACK bits can be added to the codebook when a single TB is configured or two TBs are configured with spatial bundling enabled, and M*2 HARQ-ACK bits are added to the codebook when two TBs are configured without spatial bundling enabled.

Figures 4A, 4B:
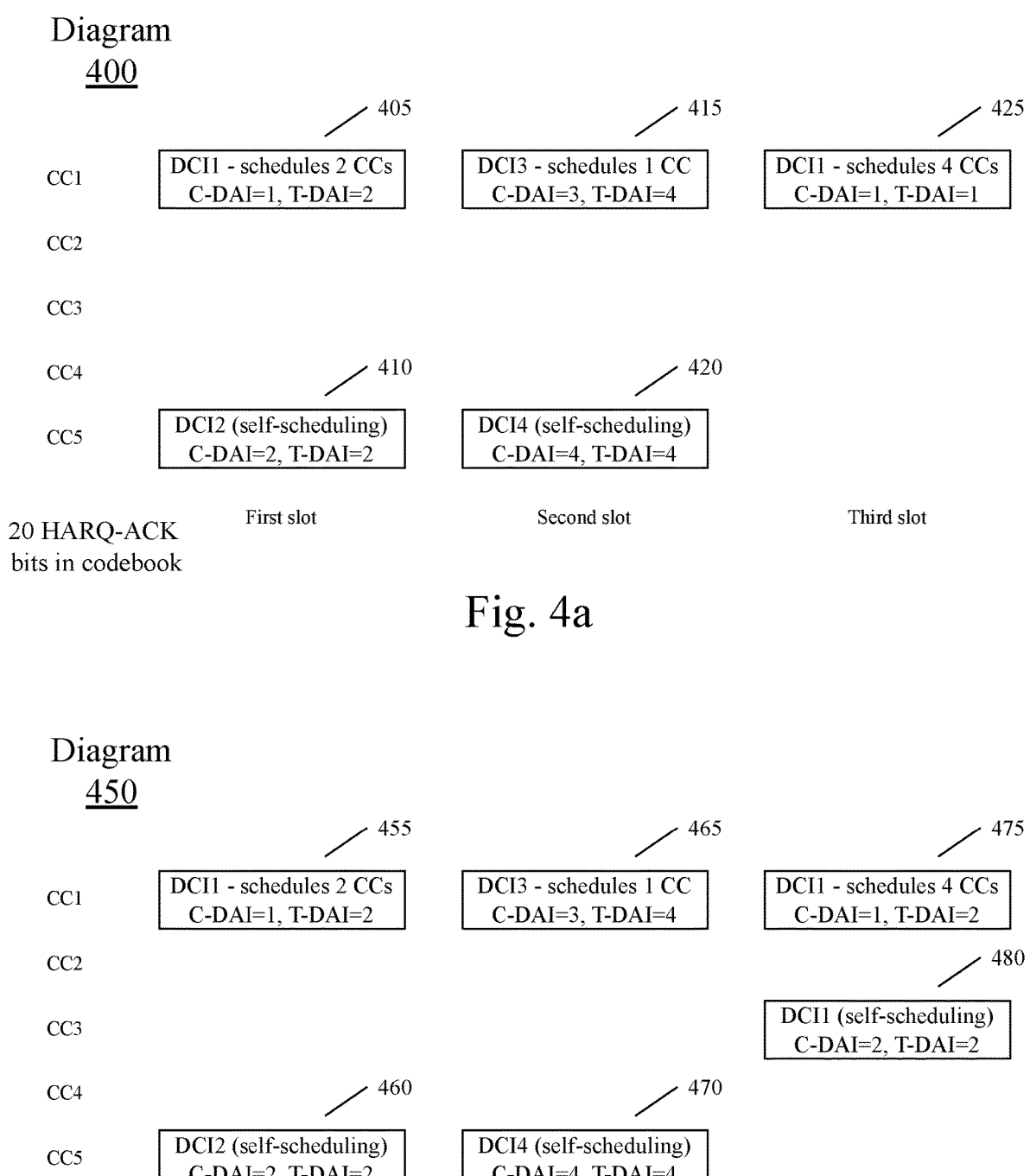
FIG. 4a shows a diagram for multi-cell scheduling DCI reception and codebook construction according to a first example for a first option.
FIG. 4b shows a diagram for multi-cell scheduling DCI reception and codebook construction according to a second example for the first option.

FIG. 4a shows a diagram 400 for multi-cell scheduling DCI reception and codebook construction according to a first example for a first option. In this example, a UE is configured with five component carriers (CC), e.g., CCs 1-5, across five different cells. In this example, the PDCCH on CC1 can carry a DCI that schedules PDSCHs on one or more of CCs 1-4, while CC5 is provided on a self-scheduling cell. The UE receives five DCIs each scheduling various numbers of CCs across the multiple cells. It is assumed that a single TB transmission is configured on all the CCs.

According to this example, the UE receives a first DCI (DCI1) 405 on CC1 scheduling two CCs and a second DCI (DCI2) 410 on CC5 scheduling one CC (self-scheduling CC5) in a first slot. The UE additionally receives a third DCI (DCI3) 415 on CC1 scheduling one CC and a fourth DCI (DCI4) 420 on CC5 scheduling one CC (self-scheduling CC5) in a second slot. The UE additionally receives a fifth DCI (DCI5) 425 on CC1 scheduling four CCs in a third slot.

According to this first option, the C-DAI/T-DAI are incremented per DCI. Thus, for DCI1 405, C-DAI=1 and T-DAI=2 and, for DCI2 410, C-DAI=2 and T-DAI=2. For DCI3 415, C-DAI=3 and T-DAI=4 and, for DCI4 420, C-DAI=4 and T-DAI=4. For DCI5 425, the counters increment but C-DAI=1 and T-DAI=1 because the bit width for C-DAI/T-DAI is only 2-bit.

N HARQ-ACK bits are added to the codebook for each incremented DAI value (e.g., for each received DCI). Thus, in this example, the codebook size is 4*5=20 HARQ-ACK bits.

FIG. 4b shows a diagram 450 for multi-cell scheduling DCI reception and codebook construction according to a second example for the first option. In this example, similar to above, the UE is configured with five component carriers (CC), e.g., CCs 1-5, across five different cells. Similar to above, the PDCCH on CC1 can carry a DCI that schedules PDSCHs on one or more of CCs 1-5, while CC5 is provided on a self-scheduling cell. In addition, in this example, CCs 2-4 can also do self-scheduling. The UE receives six DCIs each scheduling various numbers of CCs across the multiple cells. It is assumed that a single TB transmission is configured on all the CCs.

According to this example, the UE receives a first DCI (DCI1) 455 on CC1 scheduling two CCs and a second DCI (DCI2) 460 on CC5 scheduling one CC (self-scheduling CC5) in a first slot. The UE additionally receives a third DCI (DCI3) 465 on CC1 scheduling one CC and a fourth DCI (DCI4) 470 on CC5 scheduling one CC (self-scheduling CC5) in a second slot. The UE additionally receives a fifth DCI (DCI5) 475 on CC1 scheduling four CCs and a sixth DCI (DCI6) 480 on CC3 scheduling one CC (self-scheduling CC3) in a third slot.

According to this first option, the C-DAI/T-DAI are incremented per DCI. Thus, for DCI1 455, C-DAI=1 and T-DAI=2 and, for DCI2 460, C-DAI=2 and T-DAI=2. For DCI3 465, C-DAI=3 and T-DAI=4 and, for DCI4 470, C-DAI=4 and T-DAI=4. For DCI5 475, the counters increment but C-DAI=1 and T-DAI=2 and, for DCI6 480, C-DAI=2 and T-DAI=2, because the bit width for C-DAI/T-DAI is only 2-bit.

N HARQ-ACK bits are added to the codebook for each incremented DAI value (e.g., for each received DCI). Thus, in this example, the codebook size is 4*6=24 HARQ-ACK bits.

According to a second option, the Type-2 HARQ-ACK codebook is constructed as a concatenation of two sub-codebooks, where the first sub-codebook is constructed for DCIs scheduling a single cell/PDSCH, and the second sub-codebook is constructed for DCIs scheduling more than one cells/PDSCHs.

In the second option, the C-DAI and T-DAI values increment independently for DCIs corresponding to the respective sub-codebooks. For the first sub-codebook, legacy behavior can be followed, e.g., for each incremented DAI value, one HARQ-ACK bit is added to the codebook. The first sub-codebook includes, e.g., any DCI that schedules a single cell/PDSCH, including DCI format 1_0, or DCI format 1_1/1_2, which schedules a single cell/PDSCH, or a multi-cell scheduling DCI format that schedules a single cell/PDSCH. The first sub-codebook can additionally include a HARQ-ACK bit corresponding to SPS PDSCH release or SCell dormancy indication without scheduled PDSCH. If HARQ-ACK bundling across multiple cells is enabled, the first sub-codebook further includes any DCI scheduling multiple cells/PDSCHs belonging to the same cell group for HARQ-ACK bundling.

For the second sub-codebook, for each incremented DAI value, N or N*2 HARQ-ACK bits are added to the codebook, depending on the maximum number of TBs configured and whether spatial HARQ-ACK bundling is enabled. If HARQ-ACK bundling across multiple cells is enabled, N is replaced by M, where M is the number of cell groups for HARQ-ACK bundling, and the second sub-codebook corresponds to DCIs scheduling cells/PDSCHs belonging to more than one cell group for HARQ-ACK bundling.

Figure 5A:
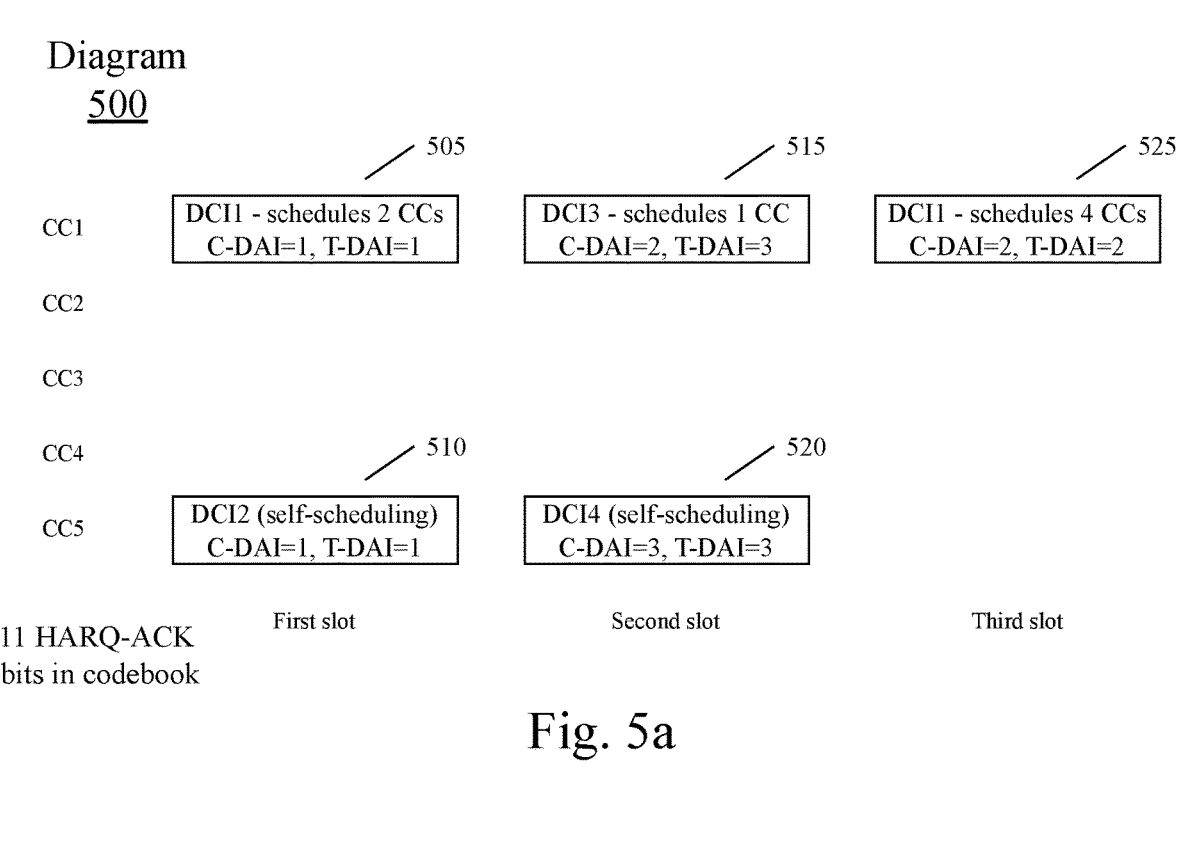
FIG. 5a shows a diagram for multi-cell scheduling DCI reception and codebook construction according to a first example for a second option.

FIG. 5*a* shows a diagram 500 for multi-cell scheduling DCI reception and codebook construction according to a first example for a second option. In this example, similar to the diagram 400 of FIG. 4*a* above, the UE is configured with five component carriers (CC), e.g., CCs 1-5, across five different cells, wherein the PDCCH on CC1 can carry a DCI that schedules PDSCHs on one or more of CCs 1-4 and CC5 is provided on a self-scheduling cell. The UE receives five DCIs each scheduling various numbers of CCs across the multiple cells. It is assumed that a single TB transmission is configured on all the CCs.

Similar to the diagram 400 of FIG. 4*a*, according to this example, the UE receives a first DCI (DCI1) 505 on CC1 scheduling two CCs and a second DCI (DCI2) 510 on CC5 scheduling one CC (self-scheduling CC5) in a first slot; a third DCI (DCI3) 515 on CC1 scheduling one CC and a fourth DCI (DCI4) 520 on CC5 scheduling one CC (self-scheduling CC5) in a second slot; and a fifth DCI (DCI5) 525 on CC1 scheduling four CCs in a third slot.

According to this second option, the C-DAI/T-DAI are incremented independently for DCIs corresponding to a respective sub-codebook. Thus, for DCI1 505 belonging to the second sub-codebook, C-DAI=1 and T-DAI=1 and, for DCI2 510 belonging to the first sub-codebook, C-DAI=1 and T-DAI=1. For DCI3 515 belonging to the first sub-codebook, C-DAI=2 and T-DAI=3 and, for DCI4 520 belonging to the first sub-codebook, C-DAI=3 and T-DAI=3. For DCI5 525 belonging to the second sub-codebook, C-DAI=2 and T-DAI=2.

A HARQ-ACK bit is added to the first sub-codebook for each incremented DAI value (e.g., for each received DCI belonging to the first sub-codebook). Thus, in this example, the first sub-codebook is constructed based on DCI2 510, DCI3 515 and DCI 4 520 and the first sub-codebook size is 3 HARQ-ACK bits. N HARQ-ACK bits are added to the second sub-codebook for each incremented DAI value (e.g., for each received DCI belonging to the second sub-codebook). Thus, in this example, the second sub-codebook size is 4*2=8 HARQ-ACK bits and the total HARQ-ACK codebook size is 3+8=11 HARQ-ACK bits.

Figure 5B:
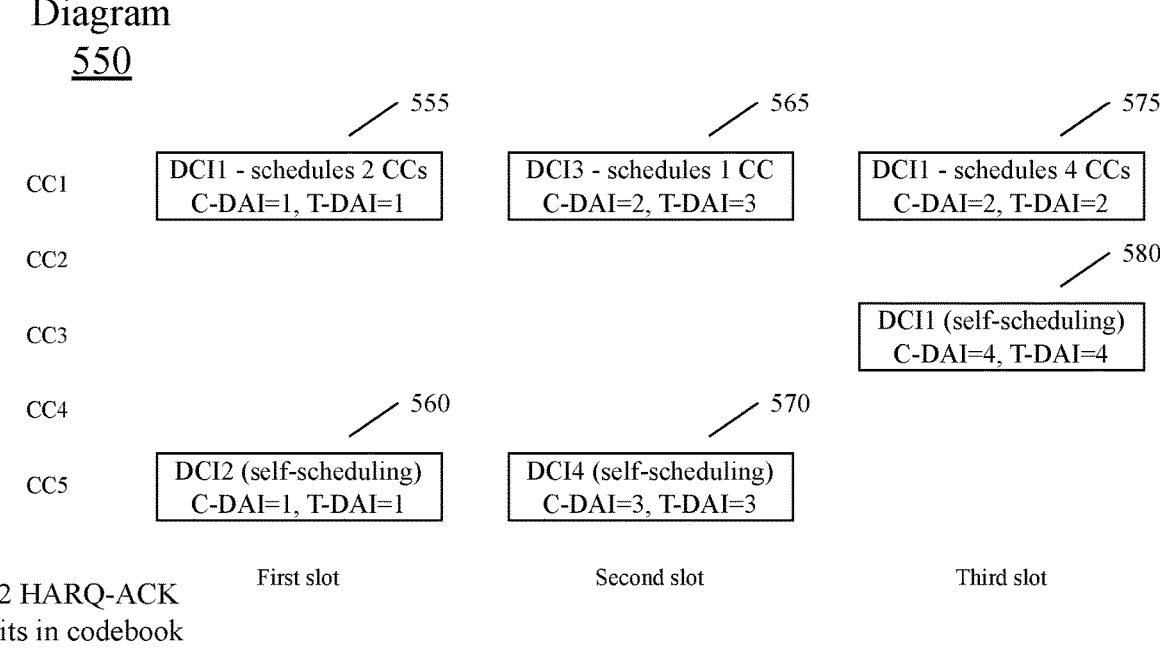
FIG. 5b shows a diagram for multi-cell scheduling DCI reception and codebook construction according to a second example for the second option.

FIG. 5*b* shows a diagram 550 for multi-cell scheduling DCI reception and codebook construction according to a second example for the second option. In this example, similar to the diagram 450 of FIG. 4*b* above, the UE is configured with five component carriers (CC), e.g., CCs 1-5, across five different cells wherein the PDCCH on CC1 can carry a DCI that schedules PDSCHs on one or more of CCs 1-5, while CC5 is provided on a self-scheduling cell, and, in addition, CCs 2-4 can also do self-scheduling. The UE receives six DCIs each scheduling various numbers of CCs across the multiple cells. It is assumed that a single TB transmission is configured on all the CCs.

Similar to the diagram 450 of FIG. 4*b*, according to this example, the UE receives a first DCI (DCI1) 555 on CC1 scheduling two CCs and a second DCI (DCI2) 560 on CC5 scheduling one CC (self-scheduling CC5) in a first slot. The UE additionally receives a third DCI (DCI3) 565 on CC1 scheduling one CC and a fourth DCI (DCI4) 570 on CC5 scheduling one CC (self-scheduling CC5) in a second slot. The UE additionally receives a fifth DCI (DCI5) 575 on CC1 scheduling four CCs and a sixth DCI (DCI6) 580 on CC3 scheduling one CC (self-scheduling CC3) in a third slot.

According to this second option, the C-DAI/T-DAI are incremented independently for DCIs corresponding to a respective sub-codebook. Thus, for DCI1 555 belonging to the second sub-codebook, C-DAI=1 and T-DAI=1 and, for DCI2 560 belonging to the first sub-codebook, C-DAI=1 and T-DAI=1. For DCI3 565 belonging to the first sub-codebook, C-DAI=2 and T-DAI=3 and, for DCI4 570 belonging to the first sub-codebook, C-DAI=3 and T-DAI=3. For DCI5 575 belonging to the second sub-codebook, C-DAI=2 and T-DAI=2 and, for DCI6 580 belonging to the first sub-codebook, C-DAI=4 and T-DAI=4. If HARQ-ACK bundling across multiple cells is enabled, the first sub-codebook further includes any DCI scheduling multiple cells/PDSCHs belonging to the same cell group for HARQ-ACK bundling.

A HARQ-ACK bit is added to the first sub-codebook for each incremented DAI value (e.g., for each received DCI belonging to the first sub-codebook). Thus, in this example, the first sub-codebook is constructed based on DCI2 560, DCI3 565, DCI4 570 and DCI6 580 and the first sub-codebook size is 4 HARQ-ACK bits. N HARQ-ACK bits are added to the second sub-codebook for each incremented DAI value (e.g., for each received DCI belonging to the second sub-codebook). Thus, in this example, the second sub-codebook size is 4*2=8 HARQ-ACK bits and the total HARQ-ACK codebook size is 4+8=12 HARQ-ACK bits.

Relative to the first option described above, using the second option can significantly reduce the size of the Type 2 HARQ-ACK codebook and thus reduce the overhead for transmitting the HARQ-ACK feedback. In the third option described below, the size of the Type 2 HARQ-ACK codebook and the overhead for transmitting the HARQ-ACK feedback can be further reduced.

According to a third option, the Type-2 HARQ-ACK codebook is constructed as a concatenation of more than two sub-codebooks to further reduce the total size of the codebook. Each sub-codebook may correspond to DCIs scheduling a same number of CCs/cells. For example, a first sub-codebook can be constructed for DCIs scheduling a single cell/PDSCH, a second sub-codebook can be constructed for DCIs scheduling two cells/PDSCHs, etc., up to N sub-codebooks that can be constructed for DCIs scheduling N cells/PDSCHs. In these embodiments, N can equal 3 or 4. However, those skilled in the art will ascertain that the number of sub-codebooks can be expanded to any number, depending on the number of different cells that can be scheduled by a single DCI (e.g., the N value semi-statically configured by the network). In one embodiment, a given sub-codebook can be constructed from two or more DCI types, e.g., DCIs scheduling three or four cells/PD-SCHs.

In the third option, the C-DAI and T-DAI values increment independently for DCIs corresponding to the respective sub-codebooks. For each sub-codebook, for each incremented DAI value, K HARQ-ACK bits are added to the codebook, where K is the maximum number of HARQ-ACK bits for the DCIs corresponding to the sub-codebook. For example, as described above, for multi-cell scheduling with up to N cells (where a first sub-codebook is constructed for DCIs scheduling a single cell/PDSCH, a second sub-codebook is constructed for DCIs scheduling two cells/PDSCHs, etc., up to N sub-codebooks), for the N-th sub-codebook, N or N*2 HARQ-ACK bits are added to the codebook (depending on the maximum number of TBs configured and whether spatial bundling is enabled). In another example, for multi-cell scheduling with up to four cells, a first sub-codebook can be constructed for DCIs scheduling a single cell/PDSCH, a second sub-codebook can be constructed for DCIs scheduling two cells/PDSCHs, and a third sub-codebook can be constructed for DCIs scheduling three or four cells/PDSCHs. For the third sub-codebook, N=4 or N*2=8 HARQ-ACK bits are added to the codebook (depending on the maximum number of TBs configured and whether spatial bundling is enabled).

Similar to the second option described above, in the third option, the first sub-codebook includes, e.g., any DCI that schedules a single cell/PDSCH, including DCI format 1_0, or DCI format 1_1/1_2, which schedules a single cell/PDSCH, or a multi-cell scheduling DCI format that schedules a single cell/PDSCH. The first sub-codebook can additionally include a HARQ-ACK bit corresponding to SPS PDSCH release or SCell dormancy indication without scheduled PDSCH. If HARQ-ACK bundling across multiple cells is enabled, the first sub-codebook further includes any DCI scheduling multiple cells/PDSCHs belonging to the same cell group for HARQ-ACK bundling.

For each of the remaining sub-codebooks, if HARQ-ACK bundling across multiple cells is enabled, the respective sub-codebook includes, e.g., DCIs scheduling cells/PD-SCHs belonging to a number of cell groups for HARQ-ACK bundling. For example, assuming there are M cell groups for HARQ-ACK bundling, there could be a total of M sub-codebooks, where, e.g., the second sub-codebook corresponds to DCIs scheduling cell/PDSCHs belonging to two cell groups for HARQ-ACK bundling, etc., and the Mth sub-codebook corresponds to DCIs scheduling cells/PD-SCHs belonging to M cell groups for HARQ-ACK bundling.

Figure 6A:
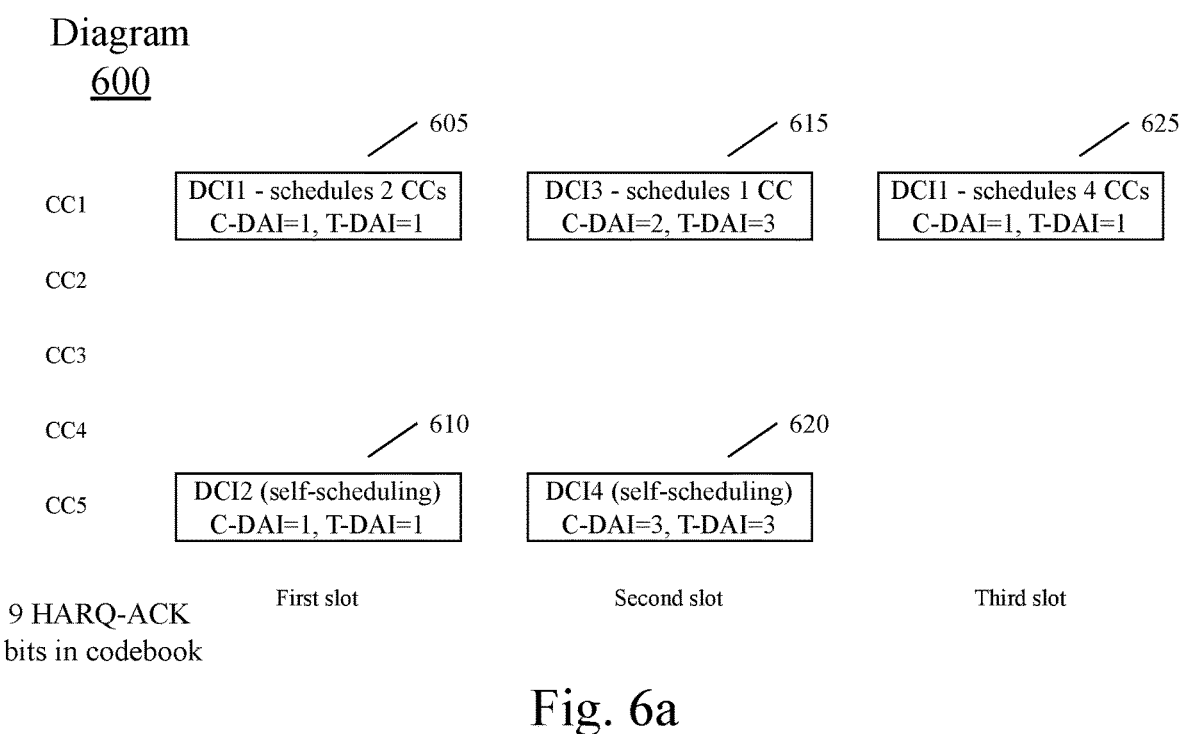
FIG. 6a shows a diagram for multi-cell scheduling DCI reception and codebook construction according to a first example for a third option.

FIG. 6a shows a diagram 600 for multi-cell scheduling DCI reception and codebook construction according to a first example for a third option. In this example, similar to the diagram 400 of FIG. 4a above, the UE is configured with five component carriers (CC), e.g., CCs 1-5, across five different cells, wherein the PDCCH on CC1 can carry a DCI that schedules PDSCHs on one or more of CCs 1-4 and CC5 is provided on a self-scheduling cell. The UE receives five DCIs each scheduling various numbers of CCs across the multiple cells. It is assumed that a single TB transmission is configured on all the CCs. Further, it is assumed that each CC corresponds to a different cell group.

Similar to the diagram 400 of FIG. 4a, according to this example, the UE receives a first DCI (DCI1) 605 on CC1 scheduling two CCs and a second DCI (DCI2) 610 on CC5 scheduling one CC (self-scheduling CC5) in a first slot; a third DCI (DCI3) 615 on CC1 scheduling one CC and a fourth DCI (DCI4) 620 on CC5 scheduling one CC (self-scheduling CC5) in a second slot; and a fifth DCI (DCI5) 625 on CC1 scheduling four CCs in a third slot.

According to this second option, the C-DAI/T-DAI are incremented independently for DCIs corresponding to a respective codebook. In this example, three sub-codebooks are constructed, e.g., a first sub-codebook for DCIs scheduling one CC (e.g., DCI2 610, DCI3 615 and DCI4 620), a second sub-codebook for DCIs scheduling 2 CCs (e.g., DCI1 605), and a third sub-codebook for DCIs scheduling 4 CCs (e.g., DCI5 625). Thus, for DCI1 605 belonging to the second sub-codebook, C-DAI=1 and T-DAI=1 and, for DCI2 610 belonging to the first sub-codebook, C-DAI=1 and T-DAI=1. For DCI3 615 belonging to the first sub-codebook, C-DAI=2 and T-DAI=3 and, for DCI4 620 belonging to the first sub=codebook, C-DAI=3 and T-DAI=3. For DCI5 625 belonging to the third sub-code-book, C-DAI=1 and T-DAI=1.

A HARQ-ACK bit is added to the first sub-codebook for each incremented DAI value (e.g., for each received DCI belonging to the first sub-codebook). Thus, in this example, the first sub-codebook is constructed based on DCI2 610, DCI3 615 and DCI4 620 and the first sub-codebook size is 3 HARQ-ACK bits. A corresponding number of HARQ-ACK bits are added to the remaining sub-codebook for each incremented DAI value (e.g., for each received DCI belonging to the second sub-codebook). Thus, in this example, the second sub-codebook size is 2*1=2 HARQ-ACK bits and the third sub-codebook size is 4*1=4 HARQ-ACK bits. The total HARQ-ACK codebook size is 3+2+4=9 HARQ-ACK bits.

Figure 6B:
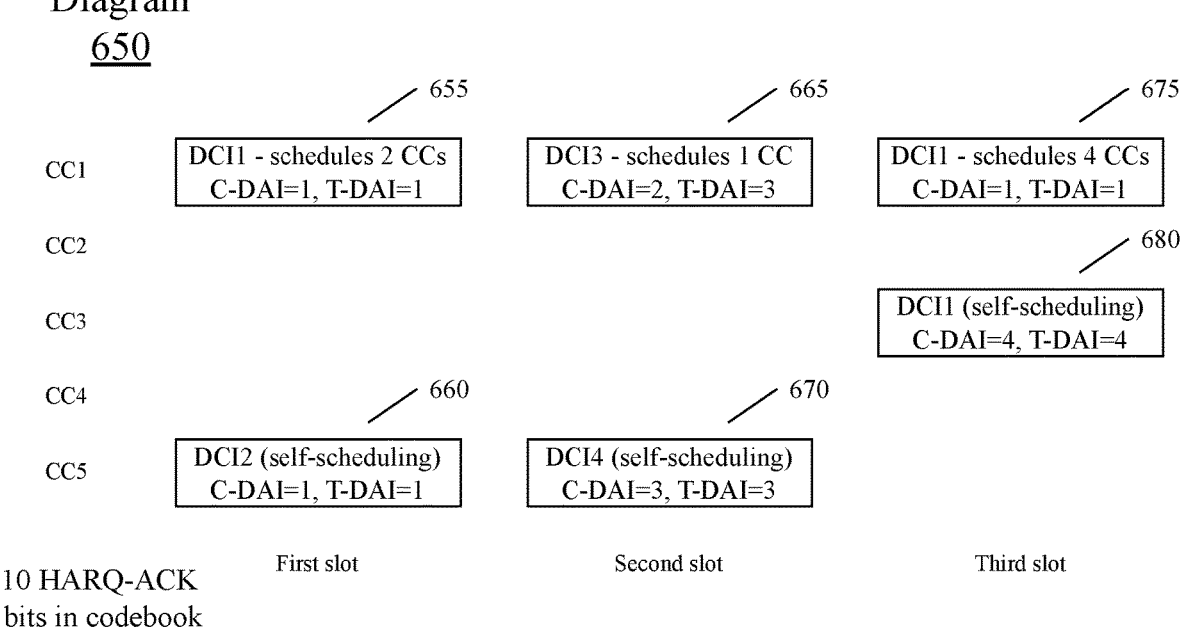
FIG. 6b shows a diagram for multi-cell scheduling DCI reception and codebook construction according to a second example for the third option.

FIG. 6b shows a diagram 650 for multi-cell scheduling DCI reception and codebook construction according to a second example for the third option. In this example, similar to the diagram 450 of FIG. 4b above, the UE is configured with five component carriers (CC), e.g., CCs 1-5, across five different cells wherein the PDCCH on CC1 can carry a DCI that schedules PDSCHs on one or more of CCs 1-5, while CC5 is provided on a self-scheduling cell, and, in addition, CCs 2-4 can also do self-scheduling. The UE receives six DCIs each scheduling various numbers of CCs across the multiple cells. It is assumed that a single TB transmission is configured on all the CCs.

Similar to the diagram 450 of FIG. 4b, according to this example, the UE receives a first DCI (DCI1) 655 on CC1 scheduling two CCs and a second DCI (DCI2) 660 on CC5 scheduling one CC (self-scheduling CC5) in a first slot. The UE additionally receives a third DCI (DCI3) 665 on CC1 scheduling one CC and a fourth DCI (DCI4) 670 on CC5 scheduling one CC (self-scheduling CC5) in a second slot. The UE additionally receives a fifth DCI (DCI5) 675 on CC1 scheduling four CCs and a sixth DCI (DCI6) 680 on CC3 scheduling one CC (self-scheduling CC3) in a third slot.

According to this third option, the C-DAI/T-DAI are incremented independently for DCIs corresponding to respective codebooks. In this example, three sub-codebooks are constructed, e.g., a first sub-codebook for DCIs scheduling one CC (e.g., DCI2 660, DCI3 665, DCI4 670 and DCI6 680), a second sub-codebook for DCIs scheduling 2 CCs (e.g., DCI1 655), and a third sub-codebook for DCIs scheduling 4 CCs (e.g., DCI5 675). Thus, for DCI1 655 belonging to the second sub-codebook, C-DAI=1 and T-DAI=1 and, for DCI2 660 belonging to the first sub-codebook, C-DAI=1 and T-DAI=1. For DCI3 665 belonging to the first sub-codebook, C-DAI=2 and T-DAI=3 and, for DCI4 670 belonging to the first sub=codebook, C-DAI=3 and T-DAI=3. For DCI5 675 belonging to the second sub-codebook, C-DAI=1 and T-DAI=1 and, for DCI6 680 belonging to the first sub-codebook, C-DAI=4 and T=DAI=4.

A HARQ-ACK bit is added to the first sub-codebook for each incremented DAI value (e.g., for each received DCI belonging to the first sub-codebook). Thus, in this example, the first sub-codebook is constructed based on DCI2 660, DCI3 665, DCI4 670 and DCI6 680 and the first sub-codebook size is 4 HARQ-ACK bits. Two HARQ-ACK bits are added to the second sub-codebook for each incremented DAI value (e.g., for each received DCI belonging to the second sub-codebook). Thus, in this example, the second sub-codebook size is 2*1=2 HARQ-ACK bits and the third sub-codebook size is 4*1=4 HARQ-ACK bits. The total HARQ-ACK codebook size is 4+2+4=10 HARQ-ACK bits.

Relative to the second option described above, using the third option can further reduce the size of the Type 2 HARQ-ACK codebook and thus reduce the overhead for transmitting the HARQ-ACK feedback.

Figure 7:
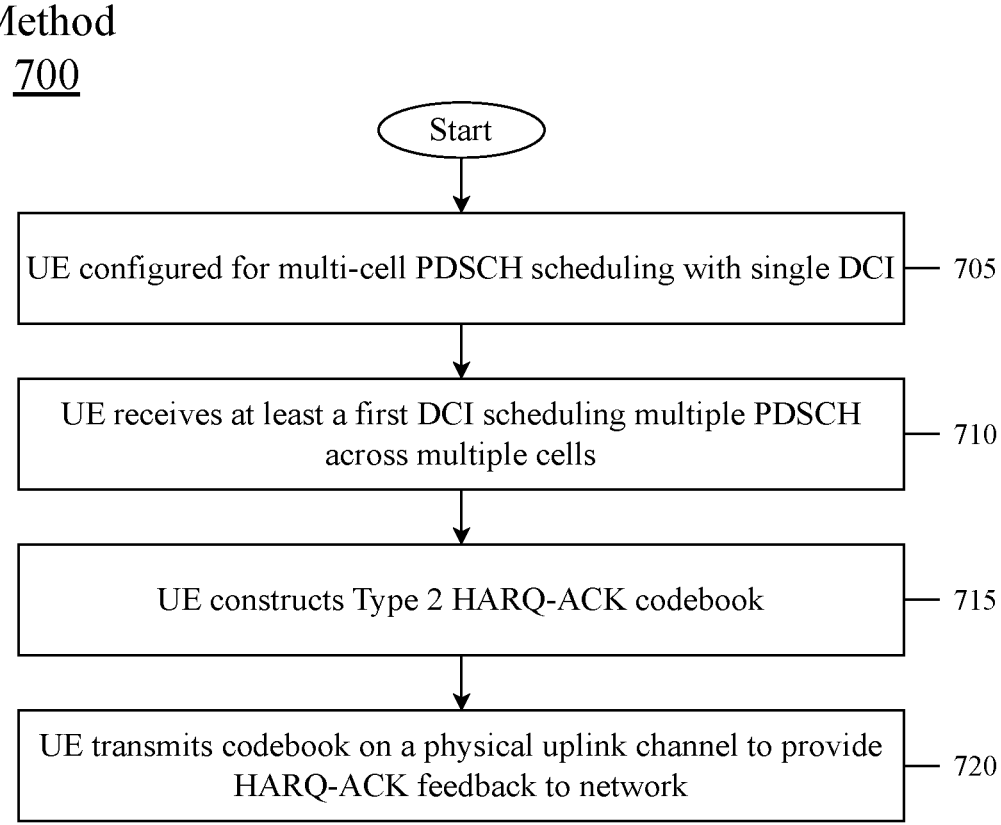
FIG. 7 shows a method for providing HARQ-ACK feedback for multiple PDSCH scheduled across multiple cells with a single DCI according to various exemplary embodiments.

FIG. 7 shows a method 700 for providing HARQ-ACK feedback for multiple PDSCH scheduled across multiple cells with a single DCI according to various exemplary embodiments.

In 705, the UE is configured for multi-cell PDSCH scheduling with a single downlink control information (DCI). The UE is additionally configured with a parameter N indicating a number of cells that can be scheduled by the single DCI. The UE can additionally be configured with HARQ-ACK bundling across cells.

In 710, the UE receives at least a first DCI scheduling multiple PDSCH across multiple cells.

In 715, the UE constructs a Type 2 HARQ-ACK codebook based in part on whether HARQ-ACK bundling across cells is enabled, a number M of cell groups for bundling across cells, a max number of TBs scheduled in the PDSCH, and whether spatial bundling is enabled, as described in the options provided above.

In 720, the UE transmits the codebook on a physical uplink channel (PUCCH or PUSCH) to provide HARQ-ACK feedback to the network.

EXAMPLES

In a first example, a processor of a user equipment (UE) is configured to perform operations comprising receiving at least a first downlink control information (DCI) from a base station of a network, the first DCI scheduling multiple physical downlink shared channels (PDSCH) across multiple cells of the UE, constructing a Type 2 hybrid automatic repeat request (HARQ) acknowledgement (HARQ-ACK) codebook based at least on a number of DCI scheduling PDSCH corresponding to the Type 2 HARQ-ACK codebook and transmitting the Type 2 HARQ-ACK codebook feedback in a physical uplink channel.

In a second example, the processor of the first example, wherein the Type 2 HARQ-ACK codebook is further constructed based on whether HARQ-ACK bundling across cells is enabled for the UE.

In a third example, the processor of the second example, wherein the operations further comprise receiving a radio resource control (RRC) configuration from the network enabling the HARQ-ACK bundling across multiple cells.

In a fourth example, the processor of the third example, wherein the RRC configuration provides at least one list of cell IDs, wherein each list of cell IDs indicates cells to bundle into a respective cell group.

In a fifth example, the processor of the third example, wherein the RRC configuration indicates a number of cells per group, wherein the operations further comprise determining which cells to bundle together based on a maximum number of cells scheduled by the first DCI and the number of cells per group indicated in the RRC configuration.

In a sixth example, the processor of the third example, wherein a HARQ-ACK feedback bit for a cell group is generated as a result of a binary AND operation for HARQ-ACK feedback bits of the cell within the cell group.

In a seventh example, the processor of the second example, wherein the operations further comprise receiving a radio resource control (RRC) configuration from the network indicating a maximum number N of cells that can be scheduled with a single DCI and determining a number M of cell groups for the N cells based on an RRC configuration from the network enabling the HARQ-ACK bundling across multiple cells.

In an eighth example, the processor of the seventh example, wherein a fixed number of HARQ-ACK bits are added to the Type 2 HARQ-ACK codebook for each DCI scheduling a PDSCH corresponding to the HARQ-ACK codebook.

In a ninth example, the processor of the eighth example, wherein a counter downlink assignment indicator (C-DAI) and a total DAI (T-DAI) are incremented per DCI received corresponding to the HARQ-ACK codebook.

In a tenth example, the processor of the ninth example, wherein, for each incremented DAI value, N bits are added to the Type 2 HARQ-ACK codebook when a single transport block (TB) is configured per PDSCH or two transport blocks are configured per PDSCH with HARQ-ACK spatial bundling.

In an eleventh example, the processor of the ninth example, wherein, for each incremented DAI value, N*2 bits are added to the Type 2 HARQ-ACK codebook when two transport blocks (TB) are configured per PDSCH without HARQ-ACK spatial bundling.

In a twelfth example, the processor of the second example, wherein the Type 2 HARQ-ACK codebook is constructed using a first sub-codebook and a second sub-codebook.

In a thirteenth example, the processor of the twelfth example, wherein the first sub-codebook is constructed for DCI scheduling a single cell or PDSCH belonging to a same cell group for HARQ-ACK bundling and the second sub-codebook is constructed for DCI scheduling more than one cell or PDSCH belonging to more than one cell group for HARQ-ACK bundling.

In a fourteenth example, the processor of the thirteenth example, wherein a fixed number of HARQ-ACK bits are added to the first sub-codebook for each DCI scheduling a single cell or PDSCH corresponding to the HARQ-ACK codebook.

In a fifteenth example, the processor of the twelfth example, wherein a counter downlink assignment indicator (C-DAI) and a total DAI (T-DAI) are incremented independently for DCI corresponding to the respective first and second sub-codebooks.

In a sixteenth example, the processor of the fifteenth example, wherein, for each incremented DAI value, M bits are added to the second sub-codebook when HARQ-ACK spatial bundling is enabled and N bits are added to the second sub-codebook when a single transport block (TB) is configured per PDSCH without HARQ-ACK spatial bundling.

In a seventeenth example, the processor of the fifteenth example, wherein, for each incremented DAI value, N*2 bits are added to the second sub-codebook when two transport blocks (TB) are configured per PDSCH without HARQ-ACK spatial bundling.

In an eighteenth example, the processor of the second example, wherein the Type 2 HARQ-ACK codebook is constructed using three or more sub-codebooks.

In a nineteenth example, the processor of the eighteenth example, wherein a counter downlink assignment indicator (C-DAI) and a total DAI (T-DAI) are incremented independently for DCI corresponding to the each respective one of the three or more sub-codebooks.

In a twentieth example, the processor of the nineteenth example, wherein, for each incremented DAI value, K HARQ-ACK bits are added to a corresponding sub-codebook, wherein K is a maximum number of HARQ-ACK bits for DCI corresponding to the respective sub-codebooks.

In a twenty first example, the processor of the nineteenth example, wherein a first sub-codebook includes any DCI scheduling a single cell or PDSCH belonging to a same cell group for HARQ-ACK bundling.

In a twenty second example, the processor of the twenty first example, wherein remaining sub-codebooks include any DCI scheduling multiple cells or PDSCH belonging to a respective number of cell groups for HARQ-ACK bundling.

In a twenty third example, a user equipment (UE) comprises a transceiver configured to communicate with a network and the processor of any of the first through twenty second example communicatively coupled to the transceiver.

In a twenty fourth example, a processor of a base station configured to perform operations comprising transmitting at least a first downlink control information (DCI) to a user equipment (UE), the first DCI scheduling multiple physical downlink shared channels (PDSCH) across multiple cells of the UE, receiving a Type 2 hybrid automatic repeat request (HARQ) acknowledgement (HARQ-ACK) codebook based at least in part on a number of DCI received scheduling PDSCH corresponding to the HARQ-ACK codebook and processing the physical uplink channel according to the Type 2 HARQ-ACK codebook construction to determine HARQ-ACK feedback for the PDSCH.

In a twenty fifth example, the processor of the twenty fourth example, wherein the Type 2 HARQ-ACK codebook is further constructed based on whether HARQ-ACK bundling across cells is enabled for the UE In a twenty sixth example, the processor of the twenty fifth example, wherein the operations further comprise transmitting a radio resource control (RRC) configuration to the UE enabling the HARQ-ACK bundling across multiple cells.

In a twenty seventh example, the processor of the twenty sixth example, wherein the RRC configuration provides at least one list of cell IDs, wherein each list of cell IDs indicates cells to bundle into a respective cell group.

In a twenty eighth example, the processor of the twenty sixth example, wherein the RRC configuration indicates a number of cells per group, wherein the UE determines which cells to bundle together based on a number of cells scheduled by the first DCI and the number of cells per group indicated in the RRC configuration.

In a twenty ninth example, the processor of the twenty sixth example, wherein a HARQ-ACK feedback bit for a cell group is generated as a result of a binary AND operation for HARQ-ACK feedback bits of the cell within the cell group.

In a thirtieth example, the processor of the twenty fifth example, wherein the operations further comprise transmitting a radio resource control (RRC) configuration to the UE indicating a maximum number N of cells that can be scheduled with a single DCI, wherein the UE determines a number M of cell groups for the N cells based on an RRC configuration from the network enabling the HARQ-ACK bundling across multiple cells.

In a thirty first example, the processor of the thirtieth example, wherein a fixed number of HARQ-ACK bits are added to the Type 2 HARQ-ACK codebook for each DCI scheduling a PDSCH corresponding to the HARQ-ACK codebook.

In a thirty second example, the processor of the thirty first example, wherein a counter downlink assignment indicator (C-DAI) and a total DAI (T-DAI) are incremented per DCI received corresponding to the HARQ-ACK codebook.

In a thirty third example, the processor of the thirty second example, wherein, for each incremented DAI value, N bits are added to the Type 2 HARQ-ACK codebook when a single transport block (TB) is configured per PDSCH or two transport blocks are configured per PDSCH with HARQ-ACK spatial bundling.

In a thirty fourth example, the processor of the thirty second example, wherein, for each incremented DAI value, N*2 bits are added to the Type 2 HARQ-ACK codebook when two transport blocks (TB) are configured per PDSCH without HARQ-ACK spatial bundling.

In a thirty fifth example, the processor of the twenty fifth example, wherein the Type 2 HARQ-ACK codebook is constructed using a first sub-codebook and a second sub-codebook.

In a thirty sixth example, the processor of the thirty fifth example, wherein the first sub-codebook is constructed for DCI scheduling a single cell or PDSCH belonging to a same cell group for HARQ-ACK bundling and the second sub-codebook is constructed for DCI scheduling more than one cell or PDSCH belonging to more than one cell group for HARQ-ACK bundling.

In a thirty seventh example, the processor of the thirty sixth example, wherein a fixed number of HARQ-ACK bits are added to the first sub-codebook for each DCI scheduling a single cell or PDSCH corresponding to the HARQ-ACK codebook.

In a thirty eighth example, the processor of the thirty fifth example, wherein a counter downlink assignment indicator (C-DAI) and a total DAI (T-DAI) are incremented independently for DCI corresponding to the respective first and second sub-codebooks.

In a thirty ninth example, the processor of the thirty eighth example, wherein, for each incremented DAI value, M bits are added to the second sub-codebook when HARQ-ACK spatial bundling is enabled and N bits are added to the second sub-codebook when a single transport block (TB) is configured per PDSCH without HARQ-ACK spatial bundling.

In a fortieth example, the processor of the thirty eighth example, wherein, for each incremented DAI value, N*2 bits are added to the Type 2 HARQ-ACK codebook when two transport blocks (TB) are configured per PDSCH without HARQ-ACK spatial bundling.

In a forty first example, the processor of the twenty fifth example, wherein the Type 2 HARQ-ACK codebook is constructed using three or more sub-codebooks.

In a forty second example, the processor of the forty first example, wherein a counter downlink assignment indicator (C-DAI) and a total DAI (T-DAI) are incremented independently for DCI corresponding to the each respective one of the three or more sub-codebooks.

In a forty third example, the processor of the forty second example, wherein, for each incremented DAI value, K HARQ-ACK bits are added to a corresponding sub-codebook, wherein K is a maximum number of HARQ-ACK bits for DCI corresponding to the respective sub-codebooks.

In a forty fourth example, the processor of the forty second example, wherein a first sub-codebook includes any DCI scheduling a single cell or PDSCH belonging to a same cell group for HARQ-ACK bundling.

In a forty fifth example, the processor of the forty fourth example, wherein remaining sub-codebooks include any DCI scheduling multiple cells or PDSCH belonging to a respective number of cell groups for HARQ-ACK bundling.

In a forty sixth example, a base station comprises a transceiver configured to communicate with a user equipment (UE) and the processor of any of the twenty fourth through forty fifth examples communicatively coupled to the transceiver.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving at least a first downlink control information (DCI) from a base station of a network, the first DCI scheduling multiple physical downlink shared channels (PDSCH) across multiple cells of the UE;
   constructing a Type 2 hybrid automatic repeat request (HARQ) acknowledgement (HARQ-ACK) codebook, wherein the Type 2 HARQ-ACK codebook is constructed by adding a total number of HARQ-ACK bits for a first sub-codebook and a total number of HARQ-ACK bits for a second sub-codebook, wherein determining the total number of HARQ-ACK bits for the second sub-codebook is based on at least a parameter indicating a maximum number of serving cells for PDSCH when spatial bundling is enabled; and
   transmitting Type 2 HARQ-ACK codebook feedback in a physical uplink channel.

2. The processor of claim 1, wherein the Type 2 HARQ-ACK codebook is further constructed based on whether HARQ-ACK bundling across cells is enabled for the UE.

3. The processor of claim 1, wherein the Type 2 HARQ-ACK codebook is constructed as a concatenation of the first sub-codebook and the second sub-codebook.

4. The processor of claim 1, wherein the first sub-codebook is constructed for DCI scheduling a single cell or PDSCH belonging to a same cell group for HARQ-ACK bundling and the second sub-codebook is constructed for DCI scheduling more than one cell or PDSCH belonging to more than one cell group for HARQ-ACK bundling.

5. The processor of claim 4, wherein a fixed number of HARQ-ACK bits are added to the first sub-codebook for each DCI scheduling a single cell or PDSCH corresponding to the Type 2 HARQ-ACK codebook.

6. The processor of claim 1, wherein a counter downlink assignment indicator (C-DAI) and a total DAI (T-DAI) are incremented independently for DCI corresponding to the respective first and second sub-codebooks.

7. The processor of claim 6, wherein, for each incremented DAI value, M bits are added to the second sub-codebook when HARQ-ACK spatial bundling is enabled and N bits are added to the second sub-codebook when a single transport block (TB) is configured per PDSCH without HARQ-ACK spatial bundling.

8. The processor of claim 6, wherein, for each incremented DAI value, N*2 bits are added to the second sub-codebook when two transport blocks (TB) are configured per PDSCH without HARQ-ACK spatial bundling.

9. A user equipment (UE), comprising:
   a transceiver configured to communicate with a base station of a network; and
   a processor communicatively coupled to the transceiver and configured to perform operations comprising:

receiving at least a first downlink control information (DCI) from the base station of the network, the first DCI scheduling multiple physical downlink shared channels (PDSCH) across multiple cells of the UE;

constructing a Type 2 hybrid automatic repeat request (HARQ) acknowledgement (HARQ-ACK) codebook, wherein the Type 2 HARQ-ACK codebook is constructed by adding a total number of HARQ-ACK bits for a first sub-codebook and a total number of HARQ-ACK bits for a second sub-codebook, wherein determining the total number of HARQ-ACK bits for the second sub-codebook is based on at least a parameter indicating a maximum number serving cells for PDSCH when spatial bundling is enabled; and transmitting Type 2 HARQ-ACK codebook feedback in a physical uplink channel.

10. The UE of claim 9, wherein the Type 2 HARQ-ACK codebook is further constructed based on whether HARQ-ACK bundling across cells is enabled for the UE.

11. The UE of claim 9, wherein the Type 2 HARQ-ACK codebook is constructed as a concatenation of the first sub-codebook and the second sub-codebook.

12. The UE of claim 9, wherein the first sub-codebook is constructed for DCI scheduling a single cell or PDSCH belonging to a same cell group for HARQ-ACK bundling and the second sub-codebook is constructed for DCI scheduling more than one cell or PDSCH belonging to more than one cell group for HARQ-ACK bundling.

13. The UE of claim 12, wherein a fixed number of HARQ-ACK bits are added to the first sub-codebook for each DCI scheduling a single cell or PDSCH corresponding to the Type 2 HARQ-ACK codebook.

14. The UE of claim 9, wherein a counter downlink assignment indicator (C-DAI) and a total DAI (T-DAI) are incremented independently for DCI corresponding to the respective first and second sub-codebooks.

15. The UE of claim 14, wherein, for each incremented DAI value, M bits are added to the second sub-codebook when HARQ-ACK spatial bundling is enabled and N bits are added to the second sub-codebook when a single transport block (TB) is configured per PDSCH without HARQ-ACK spatial bundling.

16. The UE of claim 14, wherein, for each incremented DAI value, N*2 bits are added to the second sub-codebook when two transport blocks (TB) are configured per PDSCH without HARQ-ACK spatial bundling.

17. A processor of a base station configured to perform operations comprising:

transmitting at least a first downlink control information (DCI) to a user equipment (UE), the first DCI scheduling multiple physical downlink shared channels (PDSCH) across multiple cells of the UE;

receiving a Type 2 hybrid automatic repeat request (HARQ) acknowledgement (HARQ-ACK) codebook constructed by adding a total number of HARQ-ACK bits for a first sub-codebook and a total number of determined HARQ-ACK bits corresponding to a second sub-codebook, wherein determining the total number of HARQ-ACK bits for the second sub-codebook is based on at least a parameter indicating a maximum number serving cells for PDSCH when spatial bundling is enabled; and processing a physical uplink channel according to a construction of the Type 2 HARQ-ACK codebook to determine HARQ-ACK feedback for the multiple PDSCH.

* * * * *